June 9, 1925.
F. C. HORN
POWER CONTROL MECHANISM
Filed Feb. 17, 1923
1,541,712
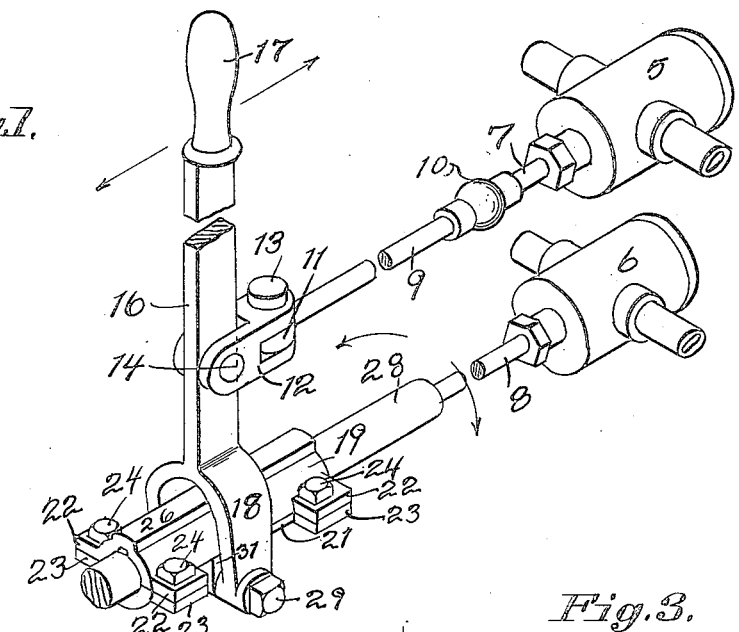
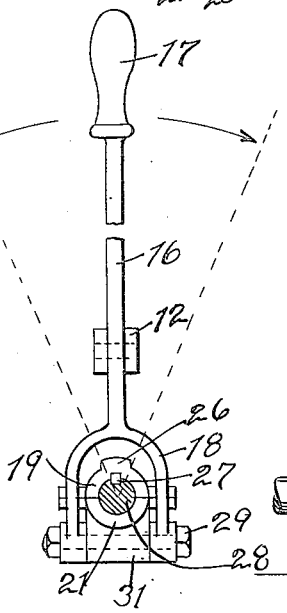
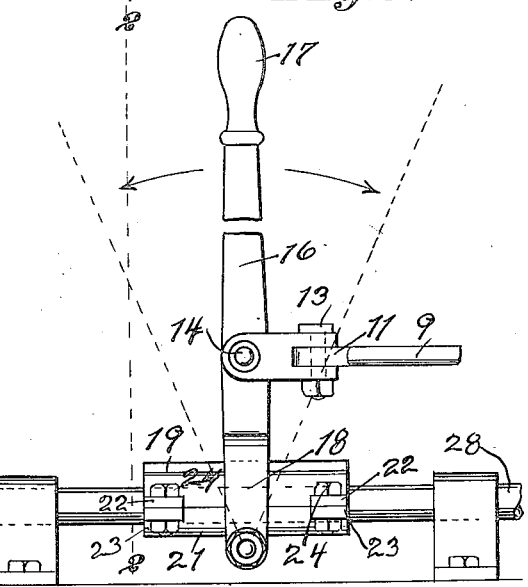
Inventor,
FLOYD C. HORN
By Victor J. Evans
Attorney.

Patented June 9, 1925.

1,541,712

UNITED STATES PATENT OFFICE.

FLOYD C. HORN, OF LOS ANGELES, CALIFORNIA.

POWER-CONTROL MECHANISM.

Application filed February 17, 1923. Serial No. 619,688.

*To all whom it may concern:*

Be it known that I, FLOYD C. HORN, a citizen of the United States, residing at Los Angeles, in the county of Los Angeles and State of California, have invented new and useful Improvements in Power-Control Mechanism, of which the following is a specification.

This invention relates to improvements in power control mechanism.

The principal object of this invention is to provide means comprising one lever for the purpose of controlling two valves, which valves control the admission of steam or air to the power mechanism.

Another object is to provide means of this character which is simple in construction, and therefore cheap to manufacture.

Another object is to simplify the labor incident to controlling two power driven apparatus at the same time without the necessity of the operator removing his hands from the control lever.

Other objects and advantages will be apparent during the course of the following description.

In the accompanying drawings forming a part of this specification, and in which like numerals are employed to designate like parts throughout the same, Figure 1 is a perspective view of my invention as applied to two two-way valves, Figure 2 is an end elevation of Figure 1, and Figure 3 is a side elevation of the lever portion of Figure 1.

In the operating of machines, such as steam shovels, it is now necessary for the operator to manipulate the various parts of the machine through the use of several throttle levers and consequently, it is necessary for him to move his hand from one lever to the other. It often happens that the operator grasps the wrong lever, resulting in an accidental movement or a waste of time in moving the hand from the wrong lever to the right one.

With my invention this difficulty is obviated, due to the fact that the operator has but one lever to control two different sets of power mechanism.

For instance, on a steam shovel there is one power mechanism for raising the shovel and there is another for swinging the shovel forward, both of which may be controlled by one lever.

In the accompanying drawings wherein for the purpose of illustration is shown a preferred embodiment of my invention, the numerals 5 and 6 refer to two two-way valves, one of which controls the admission of the power medium, such as steam to one power mechanism, while the other valve controls the admission of the power medium to the other power mechanism. These valves are each operated through the medium of a slide rod as shown at 7 and 8 respectively.

The slide rod 7 is connected to a ball joint 10 the opposite side of which ball joint is connected to a rod 9. This rod terminates in an eye 11 fitting within a connecting link 12.

A bolt 13 serves to connect one portion of the link 12 to the eye 11, while the opposite portion of the link is attached by a bolt 14 to a lever 16. This lever is provided at its upper end with a handle 17 and at its lower end with a bifurcated portion 18. This bifurcated portion is adapted to straddle two castings, of a shaft collar comprising two sections as shown at 19 and 21. These castings are secured together as by wings 22 and 23, through which bolts 24 pass.

The casting 19 is provided with an upstanding portion 26 within which a key 27 is adapted to fit. This key in turn is adapted to enter a slot formed in a shaft 28, which shaft is in turn connected to the rod 8, entering the two-way valve 6.

A bolt 29 passes through the lower extremities of the bifurcated portion 18 and also passes through a lug 31 formed upon the casting 21.

The operation of my device is as follows:—

When the handle 17 is grasped and moved in the direction of the arrows in Figures 1 or 3, the result will be that reciprocating motion will be transmitted to the rod 7 moving the valve 5 in such a manner as to allow the escape of the power medium therethrough. If it is now desired to operate the valve 6, the handle is moved in the direction of the arrows in Figure 2, transmitting rotary motion to the stem 8, it being understood that the valve 6 is of the rotary type. It is immaterial however, as to the construction of the valve as the rotary motion of the stem 8 could readily be transmitted in a reciprocating movement.

It will thus be seen that I can operate one valve without operating the other, or I can operate both valves simultaneously, the operation depending entirely upon the will of the operator.

It is to be understood that the form of my invention herewith shown and described is to be taken as a preferred example of the same, and that various changes in the shape, size and arrangement of parts may be resorted to without departing from the spirit of the invention or the scope of the subjoined claim.

Having thus described my invention, I claim:—

In a device of the character described, a lever, said lever having a bifurcated extremity, a collar secured within said bifurcated extremity and pivoted thereto, a shaft extending through said collar and means for holding said shaft against rotation with respect to said collar, a plurality of valves adapted to control a power medium, a stem extending from each of said valves one of said stems being connected to said shaft so as to be rotated thereby, the other of said stems being connected to said lever, at a point above its pivotal connection with said collar and adapted to be reciprocated by said lever.

In testimony whereof I affix my signature.

FLOYD C. HORN.